(12) United States Patent
Hoirup et al.

(10) Patent No.: US 6,308,076 B1
(45) Date of Patent: Oct. 23, 2001

(54) METHODS AND SYSTEMS FOR SYNCHRONIZATION WITH MULTIPLE FREQUENCY OFFSETS AND KNOWN TIMING RELATIONSHIPS

(75) Inventors: Carsten Hoirup, Raleigh; Amie Pendleton Palmer, Durham, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/275,060

(22) Filed: Mar. 23, 1999

(51) Int. Cl.7 .................................................. H04B 7/01
(52) U.S. Cl. ............................ 455/502; 370/324; 375/356
(58) Field of Search .................................. 455/13.1, 13.2, 455/12.1, 403, 500, 502; 370/324, 357, 503, 321; 375/344, 366, 354, 362, 358

(56) References Cited

U.S. PATENT DOCUMENTS

| | | | |
|---|---|---|---|
| 5,390,216 | * 2/1995 | Bilitza et al. | 375/106 |
| 5,428,647 | * 6/1995 | Rasky et al. | 375/366 |
| 5,509,034 | * 4/1996 | Beukema | 375/344 |
| 5,561,838 | * 10/1996 | Chandos et al. | 455/13.1 |
| 5,661,724 | * 8/1997 | Chennakeshu et al. | 370/324 |
| 5,781,540 | * 7/1998 | Malcolm et al. | 370/321 |
| 5,896,427 | * 4/1999 | Muntz et al. | 375/372 |
| 6,041,088 | * 3/2000 | McCallister | 375/358 |
| 6,061,409 | * 5/2000 | Moriya | 375/357 |
| 6,072,810 | * 6/2000 | Van Der Putten et al. | 370/503 |
| 6,072,847 | * 6/2000 | Dupuy et al. | 375/356 |
| 6,259,683 | * 7/2001 | Sekine et al. | 370/328 |

FOREIGN PATENT DOCUMENTS

| | | | |
|---|---|---|---|
| 0 817 403 A2 | 1/1998 | (EP) | H04B/7/26 |
| 2 305 924 A | 4/1997 | (GB) | H04Q/7/38 |
| WO 97/23065 | 6/1997 | (WO) | H04B/7/185 |

OTHER PUBLICATIONS

International Search Report for PCT/US00/05866.

* cited by examiner

*Primary Examiner*—Nay Maung
*Assistant Examiner*—Joy K. Contee
(74) *Attorney, Agent, or Firm*—Myers Bigel Sibley & Sajovec (57) ABSTRACT

Methods and systems are provided which store frequency settings before switching frequencies, for example, before assignment to the traffic channel when switching between a ground station and another mobile station), thus, making it possible to recall the previous frequency setting and then only perform a second pass of the synchronization process or no synchronization at all. By storing the frequency setting, either as an offset to a given frequency or as an absolute frequency for each system to be monitored, the stored frequency setting can be re-used when subsequently monitoring a system.

14 Claims, 6 Drawing Sheets

METHODS AND SYSTEMS FOR SYNCHRONIZATION WITH MULTIPLE FREQUENCY OFFSETS AND KNOWN TIMING RELATIONSHIPS

FIELD OF THE INVENTION

The present invention relates generally to wireless devices and more particularly, to the synchronization to multiple frequencies by the wireless devices.

BACKGROUND OF THE INVENTION

Digital telecommunication systems typically require that the transmitter and receiver be synchronized precisely to the time and frequency alignment of the other system components. However, such synchronization may present difficulties for a system containing multiple transmitter and/or receiver components. For example, in a system where two digital mobile communications devices in motion are communicating with each other and a ground station through, for example, a satellite, if the ground station's zero time served as the absolute timing reference, the timing relationship between all components the system would now be known. However, the frequency relationship would be unknown due to the Doppler shift of the frequency caused by the motion between the two terminals. Thus, different frequency offsets would exist between the components of the system. These frequency offsets may present problems when switching communications between the different relative frequencies of the components as insufficient time may be available to compensate for the differing offsets utilizing conventional techniques.

Another example of a system which may have difficulties resulting from multiple frequency offsets is a mobile station which monitors a broadcast control channel from one station for control information, communicates with a second station handling voice/data traffic, and reverts back to monitoring the original broadcast control channel from the first station after a call. In such a system the switching between the control station and the voice/data station may result in information loss as a result of the time required for such a switch utilizing conventional techniques.

A further example of a system which may have difficulties associated with multiple frequency offsets is a satellite communication system. In satellite-cellular communications systems, such as the ACeS (Asian Cellular Satellite System), an additional frequency shift is applied to the system from the motion of a geosynchronous satellite in an inclined orbit. Ground stations in this type of system communicate with the mobile station (user terminal) via the satellite, which causes a different Doppler shift for each ground station due to the different geographical locations of the ground stations.

The user terminal in ACeS will, depending on its mode of operation, experience multiple Doppler frequency shifts. When in Idle mode, which is when the user terminal is monitoring the system for pages, the Network Control Center (NCC) is monitored through the satellite. When a call is initiated between a user terminal and the Public Satellite Telephone Network (PSTN), the user terminal synchronizes to a gateway (GW), which will handle the signaling and voice/data communication with the ground station associated with the PSTN. A user terminal to user terminal connection through the satellite between a first user terminal and a second user terminal requires yet another synchronization process. The call is established initially between each user terminal and the gateway. When the voice channel is allocated each user terminal synchronizes to the other.

The voice channel has two logical channels: S-SACCH (Satellite-Slow Associated Control Channel) and S-TCH (Satellite-Traffic Channel). The S-TCH carries voice through the satellite from user terminal to user terminal while the S-SACCH is connected to the gateway so the system can monitor the quality of the call. Thus, the user terminal, typically, must tune to one frequency for the S-TCH, characterized by the Doppler shift caused by the satellite moving relative to the other user terminal; and a second frequency for the S-SACCH characterized by the Doppler shift caused by the satellite moving in relation to the gateway. Also, the user terminal must be able to return to the Network Control Center frequency without delay when the call terminates.

Figure 1:
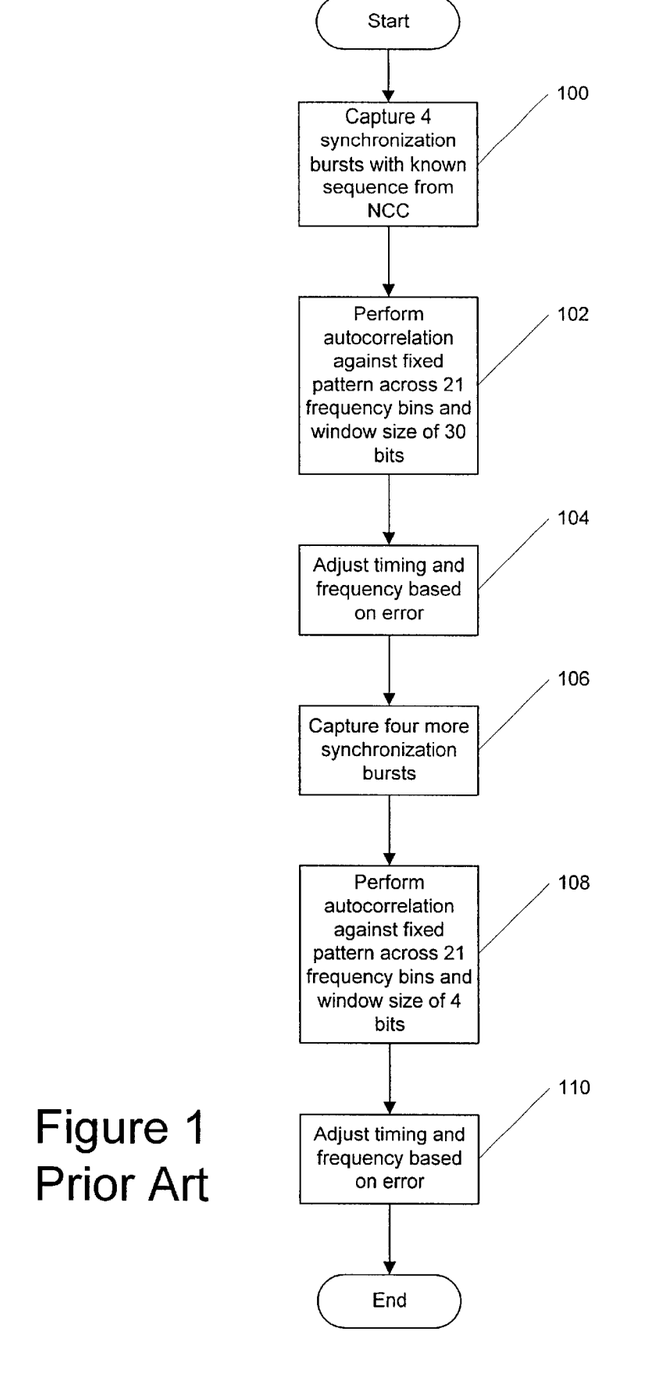
FIG. 1 is a flow chart of a conventional synchronization process.

Conventional methods for synchronization to a frequency typically involve a time and power consuming synchronization process involving multiple auto-correlations against a given bit-pattern which is performed on each frequency each time it is to be monitored. This synchronization process determines the frequency offset. Such a synchronization process is illustrated in FIG. 1. As seen in FIG. 1, the conventional synchronization process is a two-pass process with the second pass fine tuning the values from the first pass. The conventional synchronization process may begin by capturing 4 synchronization bursts sampled with a double wide window (i.e. a burst of B width is sampled in a 2B window). The synchronization bursts include known sequences from the network control center (block 100). An autocorrelation is then performed against the fixed pattern across 21 frequency bins with a window size of 30 bits (block 102). The timing and frequency are then adjusted (coarse synchronization) based upon the error resulting from the autocorrection determination (block 104). After this first pass, a second pass begins by capturing 4 more synchronization bursts utilizing a single width window (i.e. a window of B width) (block 106). The autocorrelation is then performed on these 4 synchronization bursts utilizing the fixed pattern across 21 frequency bins with a window size of 4 bits (block 108). The final timing and frequency adjustments (fine synchronization) are then made based upon the error resulting from the second autocorrelation process (block 110).

Typically, capturing four (4) synchronization bursts with the double wide window takes about 1.9 seconds, which is followed by another 120 milliseconds of Digital Signal Processor (DSP) processing. The second process using four (4) bursts with a single width window takes about the same amount of time. The complete synchronization process may take about 4 seconds for burst capture plus processing time. This process generally requires too much time to resynchronize when returning to the control channel from a traffic channel or to synchronize when switching between settings for a ground station versus a base station.

In present digital cellular systems, the user terminal tunes its oscillator to each new frequency after. completing each call. Thus, for a user terminal to base station call where the base station is a station other than the Network Control Center station, the user terminal would have to go through a synchronization process when returning to the Network Control Center station. Such a process may result in missed information during the lengthy synchronization process.

Furthermore, the synchronization process described above does not facilitate user terminal to user terminal communication because S-TCH and S-SACCH information may be spaced by as little as 900 microseconds while resynchronization between frequencies may require several milliseconds using conventional techniques. Thus, information may be lost during the resynchronization.

A further problem may arise as a result of Global System for Mobile Communications (GSM) and ACeS standards which both require that all timing be derived from a single oscillator. Due to frequency-time relationships, it may not possible to readjust the oscillator in a timely manner to account for frequency shifts when communicating with devices at two different locations having slightly different frequency shifts due to the Doppler effect or other frequency shifting mechanism.

In light of the above discussion, a need exists for improvements in the synchronization of multiple frequencies in a communication system.

SUMMARY OF THE INVENTION

In view of the above discussion, it is an object of the present invention to provide systems and methods which allow rapid switching between frequency sources.

Still another object of the present invention is to provide for rapid switching between multiple frequencies based on a single oscillator frequency.

These and other objects of the present invention are provided by methods and systems which store frequency settings before switching frequencies, for example, before assignment to the traffic channel (or when switching between a ground station and another mobile station), thus, making it possible to recall the previous frequency setting and then only perform a second pass of the synchronization process or no synchronization at all.

Because digital communication systems potentially switch between various systems faster than Doppler shifts cause significant frequency change (milliseconds versus seconds), the frequency used for communicating with the system previously is very likely still accurate during subsequent attempts to communicate with the system. By storing the frequency setting, either as an offset to a given frequency or as an absolute frequency for each system to be monitored, the stored frequency setting can be re-used when monitoring a system after an initial synchronization. This saves time and lowers power consumption when monitoring more than one system, for example, where each one has a different Doppler shift.

In particular embodiments of the present invention, methods and systems are provided which provide for rapidly synchronizing a wireless device to at least two received signals by determining synchronization parameters associated with a first received signal from a first source device and storing the determined synchronization parameters for the first received signal. The wireless device then also synchronizes to a second received signal from a second source device, where the first source device is remote from the second source device. The first received signal is then re-synchronized to utilizing the stored determined synchronization parameters associated with the first received signal. Thus, utilizing the stored parameters, the speed of the resynchronization process may be increased.

In a further embodiment of the present invention, the synchronization parameters are determined by synchronizing to the first received signal. Furthermore, the synchronization to the second received signal may be carried out by determining a frequency offset value associated with the second received signal based on the first received signal. The second received signal is then synchronized to utilizing the frequency offset value.

In a particular embodiment of the present invention, the synchronization to the first received signal so as to provide first synchronization parameters synchronizes to the first received signal utilizing a first synchronization process. In such a case then, synchronizing to the first received signal utilizing the stored determined synchronization parameters may be carried out by synchronizing to the first received signal utilizing a second synchronization process, where the second synchronization process utilizes the stored determined synchronization parameters associated with the first received signal. In particular, the second synchronization process may be an abbreviated version of the first synchronization process.

In still another embodiment of the present invention, the determination of synchronization parameters may involve determining a phase offset between the first received signal and a reference frequency so as to provide a first received signal phase offset. A phase offset between the second received signal and the reference frequency may also be determined so as to provide a second received signal phase offset. The storage of the synchronization parameters may then involve storing the first received signal phase offset to allow rapid return to synchronization to the first received signal. Furthermore, synchronizing to the first received signal and to the second received signal may be carried out by applying respective ones of the phase offsets to the reference frequency.

In a further embodiment of the present invention, the reference frequency comprises the first received signal. In such a case, the determination of a phase offset between the first received signal and the reference frequency may comprise setting the first received signal phase offset to zero.

In another embodiment of the present invention, a local oscillator of the wireless device is synchronized to a reference frequency transmitted by a third device. In a specific embodiment, the first device and the third device are located at the same geographic location and may comprise the same device.

As will be appreciated by those of skill in the art, the present invention may be provided as systems or methods, including radiotelephones or base stations which incorporate such systems or methods.

DETAILED DESCRIPTION OF THE INVENTION

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 2:
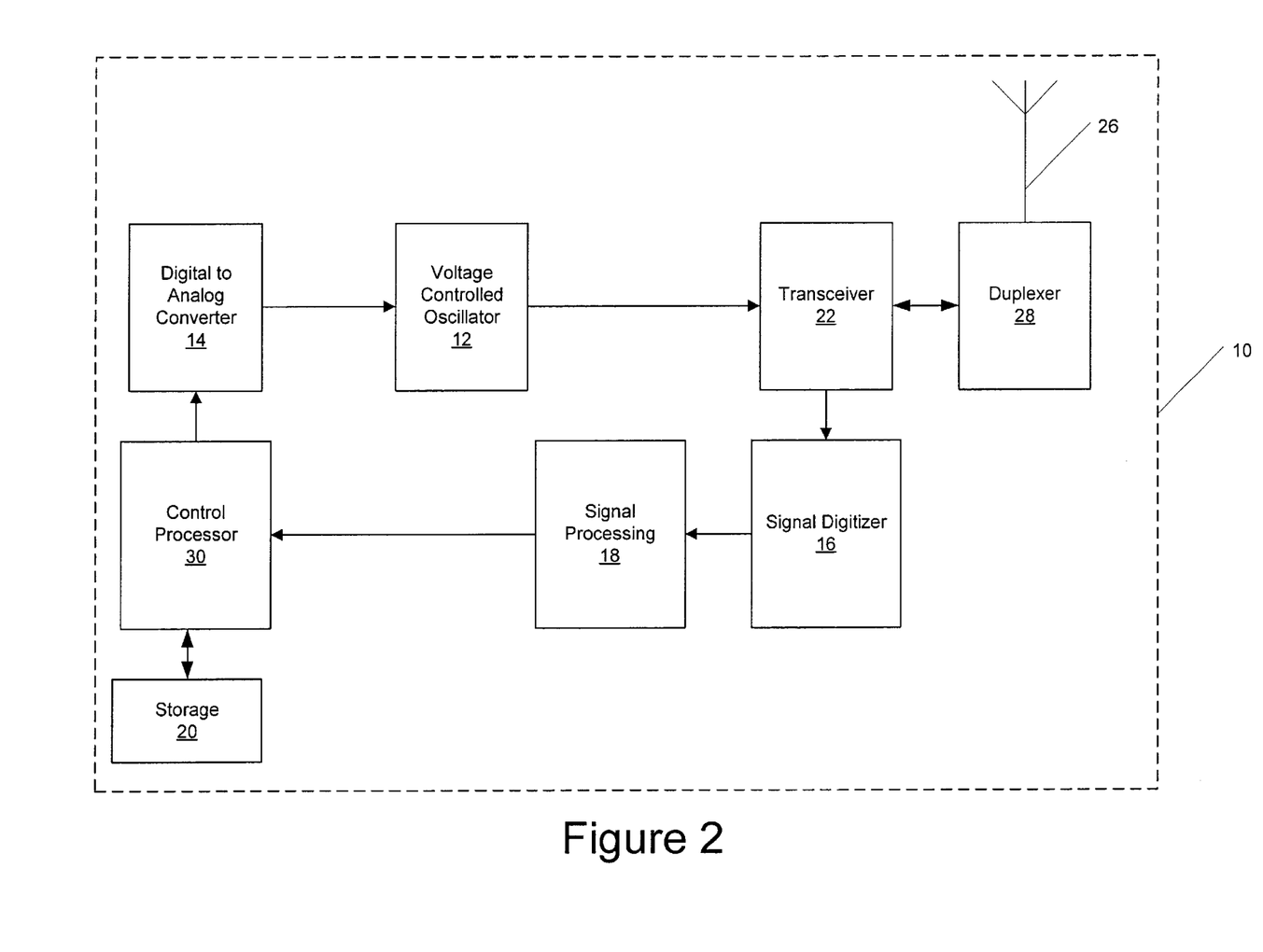
FIG. 2 is a block diagram of a wireless device suitable for use with the present invention.

An embodiment of a wireless device 10, such as a mobile user terminal, radiotelephone or other such wireless device, which incorporates the frequency offset determinations and synchronization procedures according to the present invention is illustrated in FIG. 2. As seen in FIG. 2, the wireless device 10 includes a voltage controlled oscillator (VCO) 12. The frequency of the output of the VCO 12 is dependent on an input voltage. The input voltage in the wireless device 10 illustrated in FIG. 2 is provided by digital to analog converter (DAC) 14. DAC 14 receives a digital input value from control processor 30 and converts this digital value to an analog voltage level which is provided to VCO 12 to control the output frequency of VCO 12.

As is further illustrated in FIG. 2, the VCO output is provided to a transceiver 22. The antenna structure 26 of wireless device 10 may be used to both entitled "Method of Rapidly Controlling the Frequency of a Coherent Radio Receiver and Apparatus for Carrying Out the Method," the disclosures of which are incorporated by reference as if set forth fully herein. Using any such method, the determined frequency error of the received signal relative to the receiver's own reference oscillator is periodically supplied to processor 30 to control the voltage controlled oscillator 12.

FIG. 2 also includes storage 20, which may be random access memory (RAM), non-volatile memory or other suitable storage media for storing synchronization parameters. Storage 20 is illustrated as associated with control processor 30, however, as will be appreciated by those of skill in the art, storage 20 may be associated with other functions, components or circuits, such as signal processing circuit 18. All that is needed for purposes of the present invention is that storage be available to the function or functions which maintain synchronization with the two or more received frequencies to which the wireless device 10 is to be synchronized. Thus, if the synchronization to the received signals is performed by signal processing, such as for example, by the application of a phase ramp to the reference oscillator, then such storage should be accessible to signal processing circuit 18 as illustrated in FIG. 2.

In any event, while FIG. 2 provides an example of a single oscillator mobile terminal 10 suitable for use with ACeS or GSM, the present invention should not be construed as limited to any particular hardware configuration. Other suitable hardware configurations known to those of skill in the art may also be utilized and need not be described further herein. Thus, the configuration of FIG. 2 is provided for exemplary purposes only and is not intended to limit the scope of the present invention.

Figure 3:
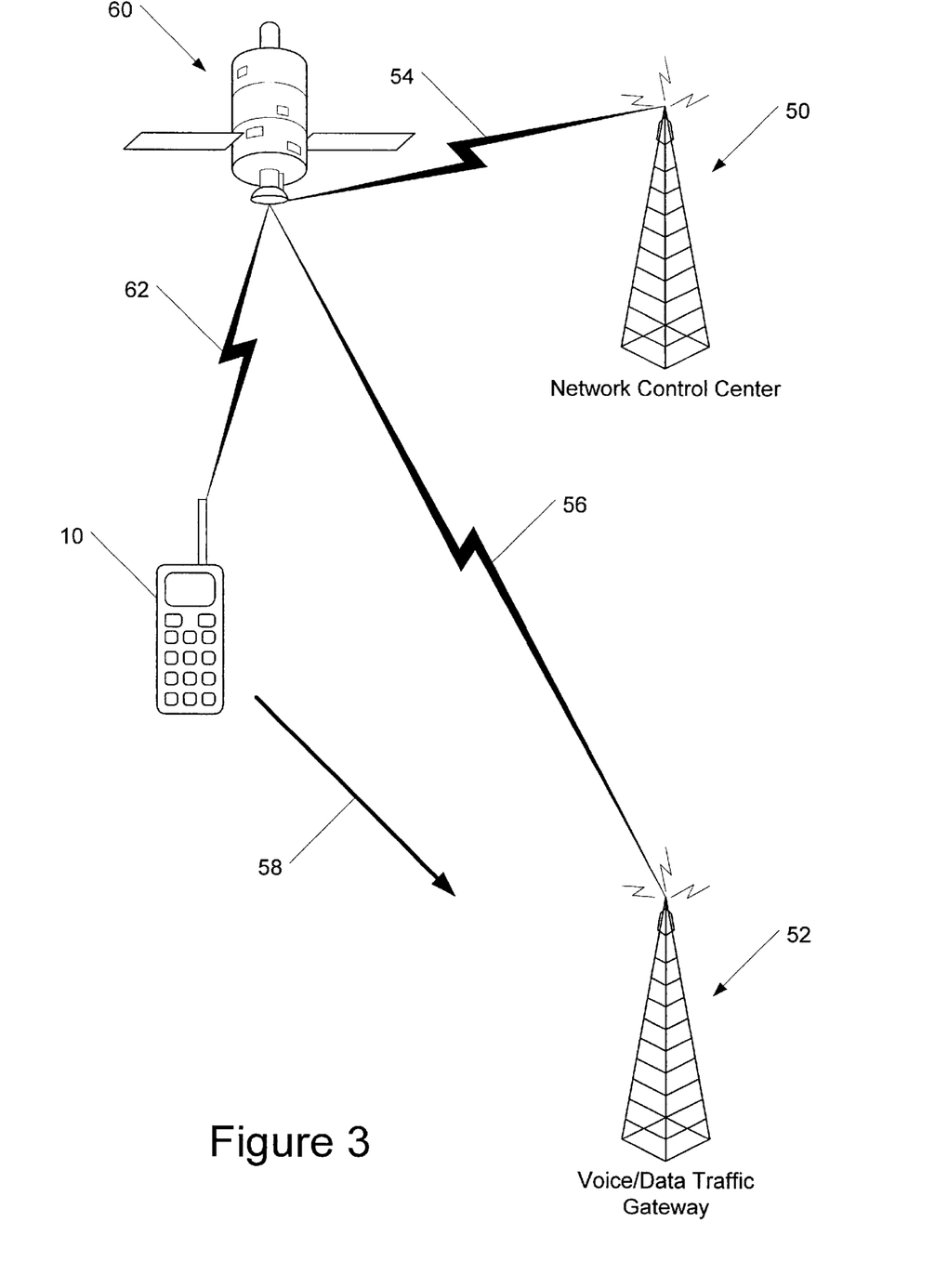
FIG. 3 is a diagram of an operating environment having a wireless device utilizing one embodiment of the present invention communicating between a network control center and a traffic/data broadcast.

FIG. 3 illustrates one operating environment where the present invention may be utilized. As seen in FIG. 3, a wireless device 10 communicates with a first station 50, which may act as a network control center, through satellite 60 and a receives voice and/or data traffic from a second station 52 through satellite 60. The wireless device 10 communicates with the first station 50 over communication channels 62 and 54 and with the second station over communication channels 62 and 56. The wireless device 10 may utilize differing frequencies for communication with the first station 50 and the second station 52. Furthermore, the frequency of the communications over channels 62, 54 and channel 56 may be affected differently by the motion of wireless device 10, thus, requiring wireless device 10 to operate at one frequency when communicating with network control center 50 and a different frequency when communicating with the voice/data traffic station 52. As described with respect to FIG. 4, the present invention may accommodate such differing frequencies without requiring extensive resynchronization procedures as would conventionally be carried out.

Figure 4:
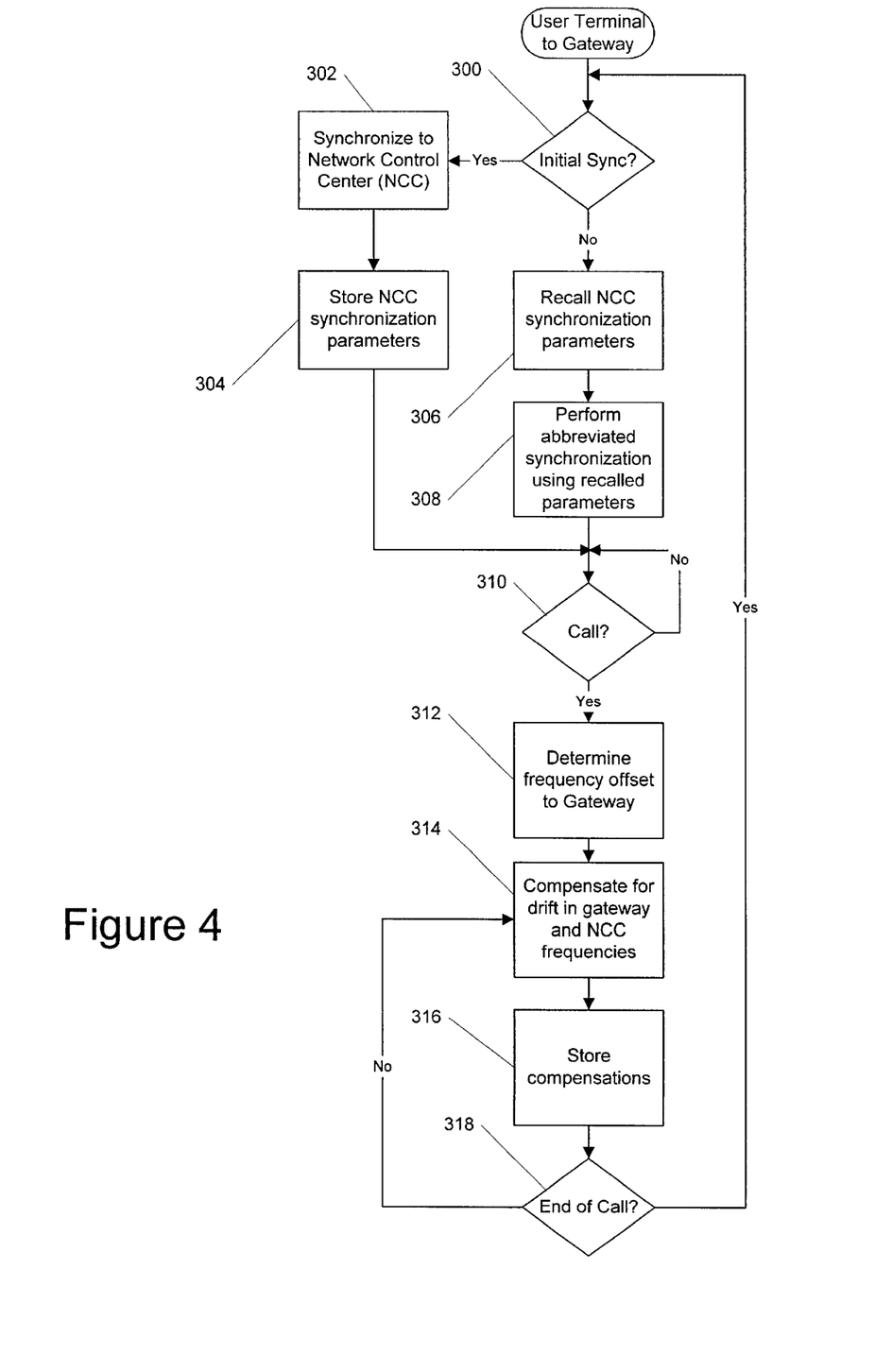
FIG. 4 is a flow chart illustrating operations of one embodiment of the present invention in the operating environment of FIG. 3.

FIG. 4 illustrates operations of a wireless device 10 according to the present invention. As seen in FIG. 4, the wireless device 10 determines if its synchronization with the network control center (station 50) is the initial synchronization to the network control center (block 300). If the synchronization is the initial synchronization, then the wireless device 10 performs a complete synchronization to the network control center frequency (block 302), such as by performing the conventional two step correlation procedure of FIG. 1. Such a synchronization may be carried out by tuning VCO 12 to the reference frequency of station 50 as described above.

The wireless device 10 then stores the synchronization parameters resulting from this initial synchronization (block 304), for example, in storage 20 of FIG. 2. The synchronization parameters stored may depend on the synchronization process performed but should include sufficient information to allow an abbreviated synchronization procedure for future synchronization or no synchronization procedure at all with the first station 50. For example, the synchronization parameters stored may include VCO input voltage, phase differences, error values or the like. The particular parameters to be stored would be implementation specific and would be readily ascertainable to those of skill in the art in light of the present disclosure. Accordingly, the present invention should not be construed as limited to storing any particular parameters or combination of parameters. However, for systems where the differences in frequency are small, it is preferred that phase rotation and de-rotation (or phase ramp) be utilized with the present invention as is described below.

After synchronization and storage of the synchronization parameters, the wireless device 10 then monitors the network control center to wait for a call, page or other communication requiring switching to a second station (block 310). When a call is received by the wireless device 10, the wireless device 10 determines the frequency offset between the second station 52 and the first station 50 and synchronizes to the second station 52 (block 312). Such a frequency offset determination may be made by conventional determination methods known to those of skill in the art. For example, in the ACeS system, the frequency offset may be determined by utilization of the autocorrelation process of FIG. 1 to determine the frequency offset of the receive synch bursts from the nominal carrier frequency obtained during the immediate assign phase of call start up.

The wireless device 10 utilizes the frequency offset to the second station 52 to synchronize to the second frequency to carry out communications with the second station 52 at the second stations frequency, and thus, takes into account the relative frequency differences resulting from motion in differing directions relative to the two stations. Synchronization to the second frequency may be accomplished by adjusting the frequency of the VCO 12 or by compensating the VCO output to adjust the frequency.

As is further illustrated in FIG. 4, the wireless device may optionally continue compensation for drift in the frequencies from the first station 50 and the second station 52 (block 314) during the call and store these compensations (block 316). This compensation and storing process may continue during the call (block 318). The drift may be tracked using conventional tracking procedures known to those of skill in the art and, therefore, will not be described further herein. While drift tracking is described herein with respect to both stations, drift tracking for the first station 50 may be optionally carried out if, for example, insufficient processing capabilities are available to carry out tracking both frequencies. In such a case, the stored synchronization parameters of block 304 would be utilized for subsequent re-synchronization to the first station.

When the call is completed, the wireless device 10 returns to operation at the network control center frequency. Because it is not the initial synchronization to the network control center of the first station 50 (block 300), the wireless device 10, when returning to the network control center, may recall the synchronization parameters previously stored (block 306) and utilize those synchronization parameters in an abbreviated synchronization procedure to resynchronize to the network control channel frequency of the first station 50 (block 308). As described above, these parameters may be the parameters stored at block 304 if drift tracking of the NCC frequency is not performed or may be the parameters stored at block 316 if drift tracking of the NCC frequency is performed.

Thus, for example, when returning to the network control channel, wireless device 10 may recall the previously stored synchronization parameters for the network control center and then perform a single pass correlation process, such as is described in blocks 106 through 110 of FIG. 1. Alternatively, the stored parameters may simply be utilized to set the frequency of the wireless device 10. Thus, the speed with which the resynchronization to the network control frequency is achieved may be increased and the delay resulting from switching between two frequency sources may be reduced. The wireless device 10 would then wait for the next call which would require switching to the traffic/data station 52 or some other second station.

Figure 5:
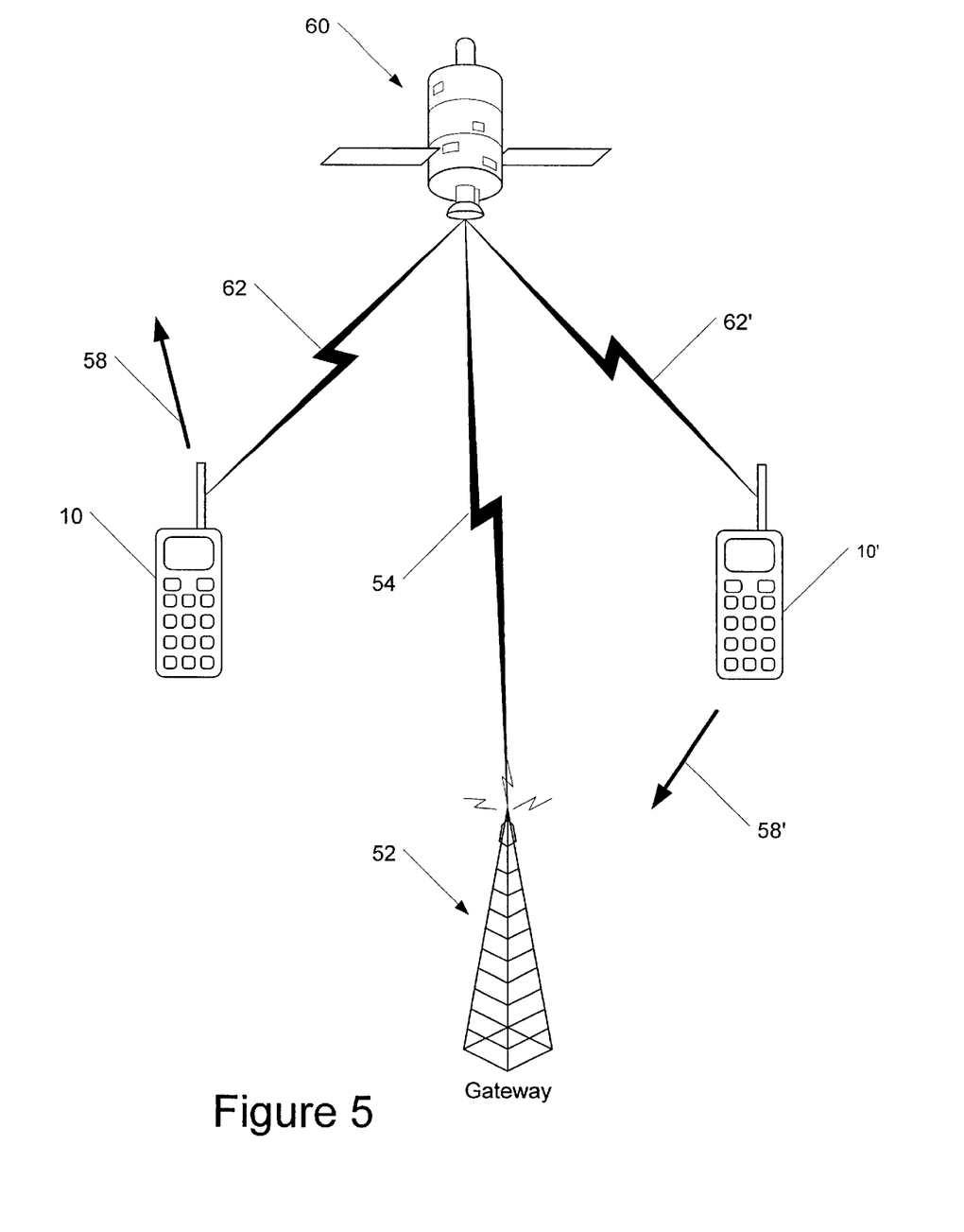
FIG. 5 is a diagram of an operating environment having a wireless device utilizing one embodiment of the present invention communicating between a network control center, a gateway and a second wireless device.

FIG. 5 illustrates a second operating environment in which an embodiment of the present invention may be advantageously utilized. As seen in FIG. 5, a wireless device 10 communicates with a first station (not shown), which may act as a network control center, and a second station 52 through a communication path such as a satellite 60. The wireless device 10 communicates with the second station 52 over communication channels 62 and 54 and with the second wireless device 10' over communication channels 62 and 62'. As is further seen in FIG. 5, a second wireless device 10' may also communicate with the second station 52 over channels 62' and 54 and the first wireless device 10 over channels 62 and 62'. The first wireless device 10 may be in motion in the direction of arrow 58 and the second wireless device 10' may also be in motion in the direction of arrow 58'. The satellite 60 acts as a conduit between the channels and translates the transmit and receive frequencies between the wireless devices 10 and 10'. Thus, the relative motions of the wireless devices 10 and 10' may result in differing frequencies required for communications on the different channels. Furthermore, the satellite 60 may also be in motion which may also add to the differing frequencies.

Typically, for wireless device 10 and wireless device 10' to communicate directly through satellite 60 they will each tune to the network control center of station (not shown), and then to the gateway of station 52 and with each other over channels 62 and 62' and then back to the network control center when a call is complete. Each device should, therefore, be capable of rapidly adjusting for the differences in frequency associated with differing relative motion of the wireless devices 10 and 10' or other causes which may result in deviation in frequency of operation. A further complication may also be present if, as with GSM or ACeS, the wireless devices are constrained to have a single local reference oscillator such as illustrated in FIG. 2.

Figure 6:
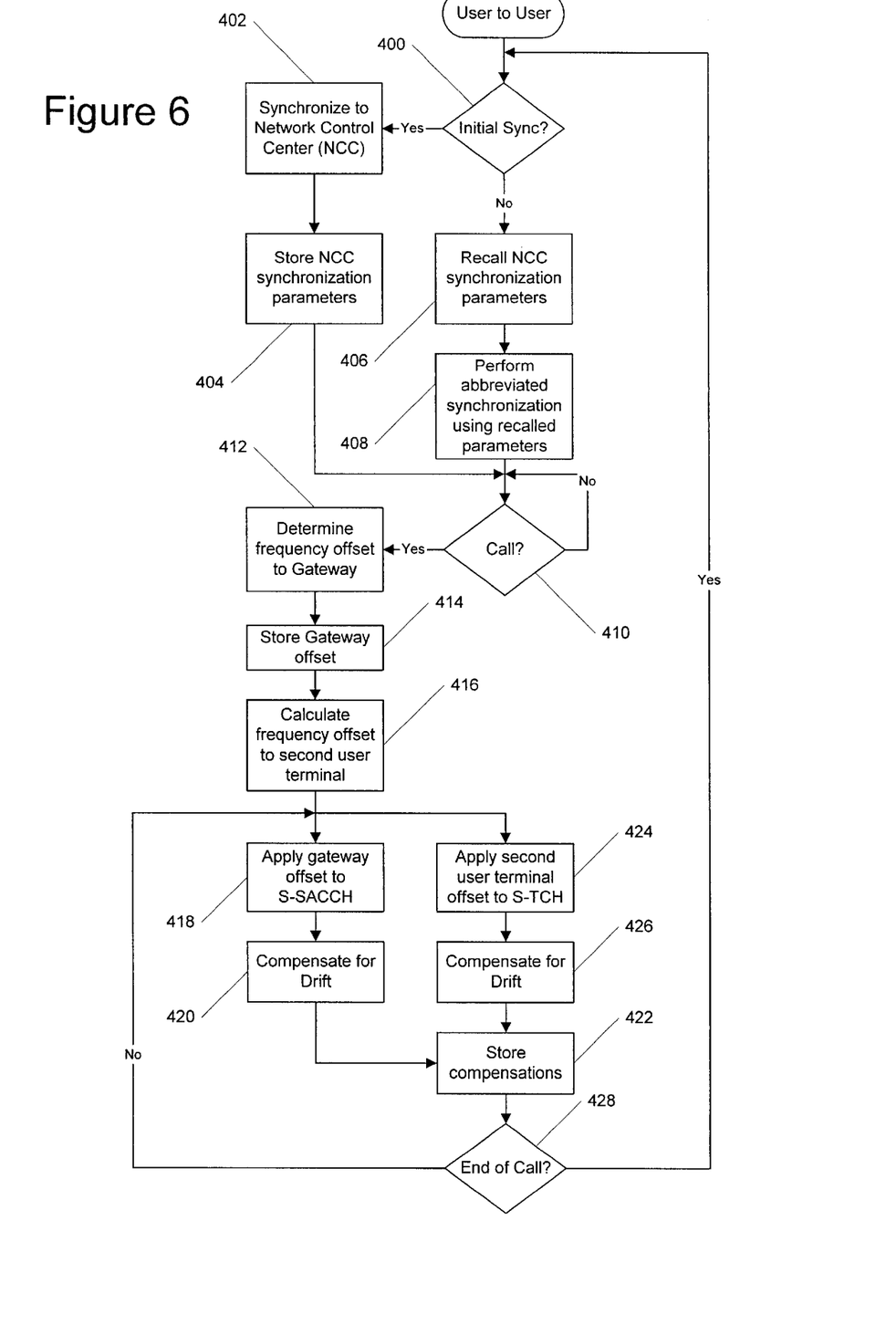
FIG. 6 is a flow chart illustrating operations of one embodiment of the present invention in the operating environment of FIG. 5.

As described with respect to FIG. 6, the present invention may accommodate such differing frequencies in a single local reference frequency device without requiring extensive resynchronization procedures as would conventionally be carried out. As discussed above, these conventional techniques may be too time consuming to allow proper operation in an environment such as is illustrated in FIG. 5.

FIG. 6 illustrates operations of wireless devices 10 and 10' according to the present invention. For clarity, however, the operations of FIG. 6 will be described with respect to wireless device 10. However, as will be appreciated in light of the present invention, preferably these operations are carried out by both wireless device 10 and wireless device 10'. As seen in FIG. 6, the wireless device 10 determines if synchronization with the network control center is the initial synchronization to the network control center (block 400). If the synchronization is the initial synchronization, then the wireless device 10 performs a complete synchronization to the network control center frequency (block 402), such as by performing the conventional two step correlation procedure of FIG. 1. The wireless device then stores the synchronization parameters resulting from this initial synchronization (block 404), for example, in storage 20 of FIG. 2.

After synchronization and storage of the synchronization parameters, the wireless device 10 then monitors the network control center to wait for a call, page or other communication requiring switching to a second station (block 410). When a call is received by the wireless device 10, the wireless device 10 determines the frequency offset between the gateway of the second station 52 and the network control station and synchronizes to the gateway station 52 which allocates communication channels 62 and 62' for communication between wireless device 10 and wireless device 10' (block 412). The synchronization to the gateway station 52 may be carried out as described above with respect to second station. The gateway offset is also stored (block 414), for example, in storage 20.

As an example, the gateway allocates a Satellite-Slow Associated Control Channel (S-SACCH) and a Satellite Traffic Channel (S-TCH) for the call. The S-TCH is a channel which carries voice from wireless device 10 to and from wireless device 10' and the S-SACCH is for maintaining communication between the gateway station 52 and each wireless device 10 and 10'. Thus, the S-TCH and the S-SACCH would correspond to differing frequencies in channels 62 and 62' in FIG. 5.

After assignment of the S-TCH, the wireless device 10 determines the frequency offset to the second wireless device 10' (block 416). The wireless device 10 then applies the gateway offset to the S-SACCH (block 418) and the frequency offset of the second wireless device 10' to the S-TCH (block 424). Each of these offsets may be compensated for drift (blocks 420 and 426) and the compensation stored (block 422). However, the determination of the drift of the S-TCH may be optional. Thus, in an alternative embodiment, block 426 may be skipped. These operations would continue until the call ends (block 428).

Because it is often the case that a single oscillator must be utilized in the wireless device 10 and 10', it is preferred that each channel, S-SACCH and S-TCH, be synchronized to by adjusting the local reference frequency with a phase offset from the local frequency. The local reference frequency is preferably synchronized to the most stable reference frequency transmitted. The phase rotation and de-rotation of the other frequencies to which the wireless device 10 or 10' are to be synchronized to may then be applied to the reference frequency to synchronize to the other frequencies.

Such a system is suitable because phase change is linear with respect to time and therefore, frequency may be expressed as frequency $=\Delta/\Delta t$ where $\Delta$ is a phase offset and $\Delta t$ is a change in time. Thus, if the frequency differences between the S-TCH and the S-SACCH are not too great, such as would be the case with respect to Doppler shift of the same frequency from two different sources, then the phase offset between the two frequencies may be used to adjust the reference frequency. Such a phase offset approach may be referred to as phase rotation or de-rotation (or "phase ramp" if the rotation and/or de-rotation is linear over time) and may be utilized to adjust the reference frequency to the new offset by adjusting the phase of the reference frequency by the phase offset, which varies over time, so as to adjust the apparent frequency of the reference frequency. Thus, for example, the phase of the reference frequency at any particular instant may be varied over a period of the reference frequency to delay the reference frequency so as to appear as a lower frequency. Similarly, the phase of the reference frequency at any particular instant may be varied over a period of the reference frequency to advance the reference frequency so as to appear as a higher frequency. As discussed above, because these "instantaneous" variations in phase vary linearly over the period of the reference frequency, this phase rotation or de-rotation process is often referred to as phase ramp. Such phase rotation and de-rotation techniques are known to those of skill in the art and, therefore, need not be described further herein.

Accordingly, the present invention allows for a user device to synchronize to multiple frequencies utilizing a single synchronized reference frequency through the utilization of phase rotation or de-rotation associated with each channel so that each channel may be synchronized without requiring resynchronization of the reference frequency. Furthermore, in such a system, a phase offset may be determined based on the difference in frequencies between the signal to be synchronized to and the reference frequency. A predefined phase ramp may then be applied to the reference frequency to provide the second frequency. Alternatively, a single or multiple phase offsets may be utilized in combination with one or more predefined phase ramps to generate the second frequency. In such a case, one or more phase offsets may be stored as well as the phase ramps which generate the second frequency. Thus, in addition to the frequency synchronization parameters described above, the present invention may store frequency synchronization parameters as frequency offsets, phase offsets, phase ramps or combinations of any of such frequency specifications.

When the call is completed, the wireless device 10 returns to operation at the network control center frequency. Because it is not the initial synchronization to the network control center (block 400), the wireless device 10 when returning to the network control center may recall the synchronization parameters previously stored (clock 406) and utilize those synchronization parameters in an abbreviated synchronization procedure to resynchronize to the network control channel frequency (block 408) as described above with respect to FIG. 4. Alternatively, if the network control center frequency is the reference frequency, no synchronization process may be needed at all. The wireless device 10 and 10' would simply resume monitoring and tracking the reference frequency from the network control center.

Various aspects and embodiments of the present invention have been described with respect to FIGS. 1, 4 and 6 which are flowchart illustrations. It will be understood that each block of the flowchart illustrations, and combinations of blocks in the flowchart illustrations, can be implemented by computer program instructions. These program instructions may be provided to a processor or signal processor, such as control processor 30 or signal processing 18, to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of rapidly synchronizing a wireless device, utilizing a single reference frequency, to at least two received signals, the method comprising the steps of:

determining a time varying phase offset between a first received signal from a first source device and the single reference frequency so as to provide a first received signal phase offset;

determining a time varying phase offset between a second received signal from a second source device and the single reference frequency so as to provide a second received signal phase offset;

synchronizing to the first received signal utilizing the first received signal phase offset by applying the first phase offset to the single reference frequency; and synchronizing to the second received signal by applying the second phase offset to the single reference frequency.

2. A method according to claim 1, further comprising the steps of:

storing the first received signal phase offset;

storing the second received signal phase offset; and switching between synchronization to the first received signal and synchronization to the second received signal by selectively applying one of the stored first received signal phase offset and the stored second received signal phase offset to the reference frequency.

3. A method according to claim 1, wherein the reference frequency corresponds to a frequency of the first received signal and wherein the step of determining a phase offset between the first received signal and the reference frequency comprises setting the first received signal phase offset to zero.

4. A method according to claim 1, further comprising the step of synchronizing a local oscillator of the wireless device to a reference frequency transmitted by a third device so as to provide the single reference frequency.

5. A method according to claim 4, wherein the first device and the third device are co-located such that Doppler shift of the reference frequency transmitted by the third device and Doppler shift of the first received signal are substantially the same.

6. A method according to claim 1, further comprising the step of selectively synchronizing a local oscillator of the wireless device to a more stable of a reference frequency transmitted by the first device and a reference frequency transmitted by the second device so as to provide the single reference frequency.

7. A method according to claim 1, wherein the steps of determining a time varying phase offset between a first received signal from a first source device and the single reference frequency so as to provide a first received signal phase offset, determining a time varying phase offset between a second received signal from a second source device and the single reference frequency so as to provide a second received signal phase offset, synchronizing to the first received signal utilizing the stored first received signal phase offset by applying the first phase offset to the single reference frequency and synchronizing to the second received signal by applying the second phase offset to the single reference frequency, comprise:

determining a frequency difference between a first received signal from a first source device and the single reference frequency so as to provide a first received frequency offset;

determining a frequency difference between a second received signal from a second source device and the single reference frequency so as to provide a second received frequency offset;

synchronizing to the first received signal utilizing the stored first received frequency offset by applying a predefined phase ramp associated with the first received frequency offset to the single reference frequency; and synchronizing to the second received signal by applying a predefined phase ramp associated with the second frequency offset to the single reference frequency.

8. A wireless device which utilizes a single reference frequency to synchronize to at least two received signals, comprising:

means for determining a time varying phase offset between a first received signal from a first source device and the single reference frequency so as to provide a first received signal phase offset;

means for determining a time varying phase offset between a second received signal from a second source device and the single reference frequency so as to provide a second received signal phase offset;

means for synchronizing to the first received signal utilizing the first received signal phase offset by applying the first phase offset to the single reference frequency; and means for synchronizing to the second received signal by applying the second phase offset to the single reference frequency.

9. A wireless device according to claim 8, further comprising:

means for storing the first received signal phase offset;

means for storing the second received signal phase offset; and means for switching between synchronization to the first received signal and synchronization to the second received signal by selectively applying one of the stored first received signal phase offset and the stored second received signal phase offset to the reference frequency.

10. A wireless device according to claim 8, wherein the reference frequency corresponds to a frequency of the first received signal and wherein the means for determining a time varying phase offset between the first received signal and the reference frequency to provide a first received signal phase offset comprises means for setting the first received signal phase offset to zero.

11. A wireless device according to claim 8, further comprising means for synchronizing a local oscillator of the wireless device to a reference frequency transmitted by a third device so as to provide the single reference frequency.

12. A wireless device according to claim 9, wherein the first device and the third device are co-located such that Doppler shift of the reference frequency transmitted by the third device and Doppler shift of the first received signal are substantially the same.

13. A wireless device according to claim 8, further comprising means for selectively synchronizing a local oscillator of the wireless device to a more stable of a reference frequency transmitted by the first device and a reference frequency transmitted by the second device so as to provide the single reference frequency.

14. A wireless device according to claim 8, wherein the means for determining a time varying phase offset between a first received signal from a first source device and the single reference frequency so as to provide a first received signal phase offset, means for determining a time varying phase offset between a second received signal from a second source device and the single reference frequency so as to provide a second received signal phase offset, means for synchronizing to the first received signal utilizing the stored first received signal phase offset by applying the first phase offset to the single reference frequency and means for synchronizing to the second received signal by applying the second phase offset to the single reference frequency, comprise:

means for determining a frequency difference between a first received signal from a first source device and the single reference frequency so as to provide a first received frequency offset;

means for determining a frequency difference between a second received signal from a second source device and the single reference frequency so as to provide a second received frequency offset;

means for synchronizing to the first received signal utilizing the stored first received frequency offset by applying a predefined phase ramp associated with the first received frequency offset to the single reference frequency; and means for synchronizing to the second received signal by applying a predefined phase ramp associated with the second frequency offset to the single reference frequency.

* * * * *

UNITED STATES PATENT AND TRADEMARK OFFICE
CERTIFICATE OF CORRECTION

| | | |
|---|---|---|
| PATENT NO. | : 6,308,076 B1 | Page 1 of 2 |
| APPLICATION NO. | : 09/275060 | |
| DATED | : October 23, 2001 | |
| INVENTOR(S) | : Hoirup et al. | |

It is certified that error appears in the above-identified patent and that said Letters Patent is hereby corrected as shown below:

IN THE SPECIFICATION

Col. 5, line 28 following "both" insert the following

-- transmit and receive signals to and from a base station or other wireless devices or satellites. The antenna structure 26 may be connected to the transceiver 22 through a duplexer 28. Conventional transceivers 22 as well as antenna structures 26 and duplexers 28 may be utilized in a wireless device 10 incorporating the present invention. Accordingly, as these aspects of the wireless device 10 are well known to those of skill in the art, no further discussion will be provided herein.

The wireless device 10 of Figure 2 also includes a signal digitizer 16 and signal processing 18. The digitizer 16 receives the synchronizing frequency signal transmitted by the base station and provides a digital representation of the synchronizing frequency signal to the signal processing 18. The signal processing circuit 18 receives the digital information from the digitizer 16 and provides a frequency error estimate to the control processor 30. The control processor 30 receives the error estimate and utilizes the error estimate to provide a revised digital value to the D/A 14 so as to control the frequency of the output of the VCO 12 in such a way as to minimize future error estimates.

In one embodiment, the digitizer 16 can comprise a phase digitizer and an amplitude (Received Signal Strength Indicator, "RSSI") digitizer as disclosed in U.S. Patent No. 5,048,059 entitled "Logpolar Signal Processing," the disclosure of which is incorporated herein by reference as if set forth fully herein. In another embodiment, the digitizer 16 can comprise a Cartesian signal digitizer which digitizes in-phase and quadrature vector components of the received signal. Such a Cartesian signal digitizer is described in U.S. Patent No. 5,214,702 entitled "DC Offset Compensation in A Radio Receiver", which is hereby incorporated by reference herein. U.S. Patent Nos. 5,084,669 entitled "Direct Phase Digitization," 5,148,373 entitled "Method and an Arrangement for Accurate Digital Determination of the Time or Phase Position of a Signal Pulse Train" and
5,220,275 entitled "Accumulator Phase Digitizer," the disclosures of which are incorporated by reference as if set forth fully herein, describe methods for implementing the phased digitizer, if used.

Whether Logpolar or Cartesian digitization is used, it is known that one form can be converted to the other and vice versa, depending on which is more convenient for subsequent processing.

UNITED STATES PATENT AND TRADEMARK OFFICE
CERTIFICATE OF CORRECTION

PATENT NO. : 6,308,076 B1
APPLICATION NO. : 09/275060
DATED : October 23, 2001
INVENTOR(S) : Hoirup et al.

It is certified that error appears in the above-identified patent and that said Letters Patent is hereby corrected as shown below:

The digitized signal may be processed in a number of ways to decode information as well as for determining a frequency error value. For example, if the signal being processed is an Analog Mobile Phone Service (AMPS) analog control channel signal, it may be processed as described in U.S. Patent No. 5,475,705 entitled "Demodulator for Manchester-coded FM Signals," the disclosure of which is incorporated by reference as if set forth fully herein. Alternatively, if the signal is a digitally-modulated signal to be processed by a Maximum Likelihood Sequence Estimator, the processing may be as described in United States Patent Nos. 5,093,848 entitled "Method of Controlling the Frequency of a Coherent Radio Receiver and Apparatus for Carrying Out the Method." or 5,136,616 --

IN THE CLAIMS

Column 12, line 24, Claim 12, please change "claim 9" to -- claim 11 --.

Signed and Sealed this

Nineteenth Day of February, 2008

JON W. DUDAS
*Director of the United States Patent and Trademark Office*